United States Patent
Funakoshi et al.

(10) Patent No.: US 6,303,734 B1
(45) Date of Patent: Oct. 16, 2001

(54) STABILIZED AROMATIC POLYCARBONATE

(75) Inventors: Wataru Funakoshi; Hiroaki Kaneko; Katsushi Sasaki, all of Yamaguchi (JP)

(73) Assignee: Teijin Limited, Osaka (JP)

(*) Notice: Subject to any disclaimer, the term of this patent is extended or adjusted under 35 U.S.C. 154(b) by 0 days.

(21) Appl. No.: 09/424,151

(22) PCT Filed: Mar. 26, 1999

(86) PCT No.: PCT/JP99/01563
    § 371 Date: Nov. 19, 1999
    § 102(e) Date: Nov. 19, 1999

(87) PCT Pub. No.: WO99/50335
    PCT Pub. Date: Oct. 7, 1999

(30) Foreign Application Priority Data

Mar. 27, 1998 (JP) ................................................ 10-081589

(51) Int. Cl.$^7$ .................................................... C08G 64/00
(52) U.S. Cl. ............................................ 528/196; 528/198
(58) Field of Search ...................................... 528/196, 198

(56) References Cited

FOREIGN PATENT DOCUMENTS

| 4-328124 | 11/1992 | (JP) . |
| 4-328156 | 11/1992 | (JP) . |
| 7-292096 | 11/1995 | (JP) . |
| 8-59975 | 3/1996 | (JP) . |
| 10-36497 | 2/1998 | (JP) . |

*Primary Examiner*—Terressa M. Boykin
(74) *Attorney, Agent, or Firm*—Sughrue, Mion, Zinn, Macpeak & Seas, PLLC

(57) ABSTRACT

The relative intensity of fluorescent light of a melt-polycondensed aromatic polycarbonate produced by the transesterification process (melt polymerization process) of an aromatic dihydroxy compound and a carbonic acid diester in the presence of a catalyst comprising a basic nitrogen compound and/or a basic phosphorus compound in combination with an alkali metal compound is suppressed to $4.0 \times 10^{-3}$ or below at a wavelength of 465 nm based on a standard substance in a fluorescent light spectrum obtained by the excitation wavelength of 320 nm. An aromatic polycarbonate having good color stability, especially good stability to the deterioration of the chip color during storage of the chip in air at room temperature can be produced by the present invention.

7 Claims, No Drawings

STABILIZED AROMATIC POLYCARBONATE

TECHNICAL FIELD

This invention relates to a stabilized aromatic polycarbonate, more particularly, to an aromatic polycarbonate having high color stability.

BACKGROUND ARTS

Polycarbonate resin is being used in various uses in large quantity owing to its self-extinguishing nature, excellent optical characteristics, electrical characteristics and dimensional stability, good mechanical properties such as impact resistance and high heat-resistance, transparency, etc.

Known processes for the production of polycarbonate resin include the direct reaction of an aromatic dihydroxy compound such as bisphenol A with phosgene (interfacial polymerization process) and the transesterification of an aromatic dihydroxy compound such as bisphenol A with a carbonic acid diester such as diphenyl carbonate in molten state (melt process). Among the above processes, the transesterification of an aromatic dihydroxy compound with a carbonic acid diester (melt process) is expected to be promising in future since the process is free from the problem of using toxic phosgene and a halogen compound such as methylene chloride as a solvent in contrast to the interfacial polymerization process and a polycarbonate can be produced at a low cost by the process.

A transesterification catalyst is used usually in the melt process for the production of a polycarbonate by transesterification reaction to improve the production efficiency ("Plastic Material Course 17, Polycarbonate", pp.48–53, The Nikkan Kogyo Shimbun, Ltd., Toshihisa Tachikawa, Shoichi Sakajiri).

The preferable transesterification catalyst system is a combination of a basic nitrogen compound (also called a nitrogen-containing basic compound) and/or a basic phosphorus compound with an alkali metal compound which produces, in high productivity, a polycarbonate having good physical properties such as color tone, containing little branched structure in the polymer molecule, having good physical properties such as melt-fluidity and containing limited amount of foreign materials such as gel in the produced polycarbonate resin.

However, the polycarbonate produced by melt-polymerization process has a stability problem since the polymer contains alkali metal compounds and other metallic compounds used as a transesterification catalyst.

For example, there are short-term stability problems such as discoloration, lowering of molecular weight and generation of black foreign materials in melt-molding under heating. Long-term problems such as discoloration and lowering of molecular weight in a hot environment as well as gradual lowering of mechanical properties of molded articles are also observed. Especially, it has problems such as susceptibility to hydrolysis of the molecular chain when its molded article is kept under a special condition, for example in water, especially in hot water or in steam atmosphere.

For solving these problems, specifications of JP-A 4-328124 (hereunder, JP-A means "Japanese Unexamined Patent Publication") and JP-A 4-328156 disclosed a process for stabilizing a polycarbonate by deactivating the transesterification catalyst with an acidic compound comprising a sulfonic acid ester.

Further, the above problems have been remarkably relieved by JP-A 8-59975 which proposes the use of a specific sulfonic acid derivative as a catalyst deactivation agent (catalyst inactivation agent) to deactivate an alkali metal compound and/or an alkaline earth metal compound used as a component of a transesterification catalyst.

It is already known in general that various stabilizers are usable for preventing the short-term (especially in molding) or long-term discoloration, molecular weight lowering, etc., of a thermoplastic resin. It is also known that single or combined use of various phosphorous acid ester compounds, epoxy compounds and hindered phenol compounds as a stabilizer is effective for the stabilization of aromatic polycarbonates.

However, the desired stabilization effect is difficult to attain even by using these stabilizers according to conventional formulations to an aromatic polycarbonate produced by using a transesterification catalyst containing metallic element. The difficulty was assumed to be caused by impurities in the polycarbonate e.g. in JP-B 7-5828 (Asahi Chemical Industry Co., Ltd.) (hereunder, JP-B means "Japanese Examined Patent Publication"), which proposed a process for the stabilization of an aromatic polycarbonate by using (1) a phosphorous acid mono or diester in combination with (2) a hindered phenol antioxidation agent or a phosphorous acid triester in a polymer having an ionic chlorine content of 0.5 ppm or below.

However, the stabilizer proposed by the above patent application is not effective, as shown in the Comparative Example 3 of the application, on a melt-polymerized polycarbonate produced by using bisphenol A sodium salt as a transeterification catalyst in an amount of 5 ppm in terms of sodium component based on the bisphenol A.

In contrast to the above method, the polycarbonate stabilization effect is by far remarkable in the case of using a catalyst deactivation agent (catalyst inactivation agent) proposed by the inventors of the present invention in JP-A 8-59975, especially a sulfonic acid phosphonium salt.

With single use of an alkali metal compound catalyst as a transesterification catalyst, e.g. in the transesterification reaction of diphenyl carbonate (hereunder abbreviated as DPC) with bisphenol A (hereunder abbreviated as BPA), the reaction rate is too slow to be allowable from an industrial viewpoint when the transesterification conversion ratio is smaller than 50%, that is, at a stage in which a large amount of DPC having relatively low boiling point existing in the system makes it impossible to raise the reaction temperature. Accordingly, it is necessary to use the alkali metal compound in an amount larger than $10 \times 10^{-6}$ chemical equivalent based on 1 mol of BPA to achieve an industrially significant reaction rate.

If such a large amount of an alkali metal compound catalyst is used, a branching component is liable to be generated by the transfer of polycarbonate bonding when the polymerization temperature is increased at the later stage of the reaction. Accordingly, a melt-polymerized polycarbonate produced by transesterification has poor fluidity compared with a polycarbonate produced by interfacial polymerization owing to the presence of a larger amount of such branching components.

It is necessary to keep the amount of the above branching component at 0.2 mol % or below based on the repeating unit for producing a melt-polymerized polycarbonate having a fluidity comparable to that of a polycarbonate produced by interfacial polymerization. For satisfying the above condition, the amount of the alkali metal compound catalyst is required to be limited to $10 \times 10^{-6}$ chemical equivalent or below, more preferably $5.0 \times 10^{-6}$ chemical equivalent or below, based on 1 mol of BPA.

Effective for suppressing the branch formation and keeping the transesterification reaction rate at an industrially advantageous level is a process in which the alkali metal compound catalyst is applied in an amount limited to $5.0 \times 10^{-6}$ chemical equivalent/1 mol of BPA or below and combined with a basic nitrogen compound catalyst in an amount of $1 \times 10^{-5}$ chemical equivalent to $5.0 \times 10^{-4}$ chemical equivalent in terms of basic nitrogen based on 1 mol of BPA.

The stability of a polycarbonate is maintained at an extremely desirable level as shown in the above invention by applying to the polycarbonate produced by the above method, a sulfonic acid phosphonium salt singly or in combination with a phosphorous acid ester compound or a phenolic antioxidant according to the process disclosed in JP-A 8-59975.

Improved stability under a high-temperature condition as mentioned above, in other words under an accelerated condition, has been attained to a certain extent by adopting the above-mentioned various proposals.

However, it has been found that gradual yellowing of chips and molded articles takes place when the chips or molded articles are stored over a long period in an open air, which is under room temperature, a low temperature condition distinct from the above high-temperature condition. The tendency is especially remarkable if the chips are stored in a bright place.

DISCLOSURE OF THE INVENTION

The present invention provides an aromatic polycarbonate having high stability to the deterioration of the color of chips stored in air at room temperature by suppressing the relative intensity of fluorescent light to $4.0 \times 10^{-3}$ or below and provides an aromatic polycarbonate with improved stability of the aromatic polycarbonate composition produced in the presence of the aforementioned combined catalyst comprising a basic nitrogen compound and/or a basic phosphorus compound and an alkali metal compound, in particular, high stability to the degradation of color of the chips stored in air at room temperature.

The inventors of the present invention provide an aromatic polycarbonate having high stability to the deterioration of the color of chips stored in air at room temperature by suppressing the relative intensity of fluorescent light, based on a standard substance, of a fluorescent spectrum (excitation light wavelength: 320 nm) to $4.0 \times 10^{-3}$ or below at 465 nm for an aromatic polycarbonate produced by the melt-polycondensation of an aromatic dihydroxy compound with a carbonic acid diester by transesterification process (melt-polymerization process) in the presence of a combined catalyst comprising a basic nitrogen compound and/or a basic phosphorus compound in combination with an alkali metal compound.

In the present invention, the relative intensity of fluorescent light is measured by Hitachi F4500 with a 150W Xe lamp and a 400W photomultiplier at a slit width Ex/Em of 2.5 mm each, using a sample (concentration) of 1 mg polymer/5 ml methylene chloride with a standard substance for comparison consisting of $1.0 \times 10^{-3}$ mg of phenyl salicylate in 1 ml of methylene chloride.

As a result of vigorous investigation performed by the inventors of the present invention to achieve the above object, it has been found that an aromatic polycarbonate having high stability to the deterioration of the color of chips stored in air at room temperature can be produced by suppressing the relative intensity of fluorescent light measured under the above condition to $4.0 \times 10^{-3}$ or below.

The mechanism to involve the intensity of fluorescent light in the stability of a polymer is not yet clear, however, it is supposed that a certain component related to the fluorescent light may be involved in the deterioration of the color of a polymer stored in air. There has been absolutely no description in published literatures on the finding that the polymer stability can be foreseen by such a simple parameter as the intensity of fluorescent light. The fact that the physical properties of a polymer can be controlled by such a simple means has a great industrial significance.

Use of an aromatic polycarbonate having a stability of melt viscosity of 0.5% or below is effective for suppressing the deterioration of transparency and the deterioration of mechanical properties caused by the local lowering of molecular weight, especially that of elongation at break and/or impact strength, supposedly originating in hydrolysis reaction and other side reactions occurring over a long period of use. The terminal hydroxy group concentration of 100 eq/ton or below is also preferable from the viewpoint of prevention of discoloration, generation of foreign materials and lowering of molecular weight, at the melt molding, or in use or in storage of the polymer at high temperature over a long period.

A polycarbonate simultaneously satisfying the above two conditions with a stability of melt viscosity of 0.5% or below and a terminal hydroxy group concentration of 100 eq/ton or below is especially preferable owing to the above physical properties being more desirably stabilized. A stability of melt viscosity exceeding 0.5% and/or terminal hydroxy group concentration exceeding 100 eq/ton is not desirable as deterioration and/or lowering of the above physical properties will proceed remarkably.

For producing an aromatic polycarbonate exhibiting an intensity of fluorescent light of a specific level or below, thus having suppressed thermal decomposition and mechanical decomposition of the polymer, it is preferable, as mentioned below, to specify the amount of the transesterification catalyst, to deactivate the transesterification catalyst by a catalyst deactivation agent such as a sulfonic acid derivative, to specify the ratio of hydroxy group to the total molecular terminals regarding the molecular terminals of the polycarbonate, to specify the stability of melt viscosity and to block the molecular terminals of the aromatic polycarbonate.

The polymer temperature in the melt polycondensation reaction is preferably maintained constantly at 255° C. or below to obtain an aromatic polycarbonate exhibiting an intensity of fluorescent light of a specific level or below, thus having suppressed thermal decomposition and mechanical decomposition of the polymer.

Regarding the stirring behavior of the stirring blades of a polymerization vessel, it is preferable to obtain an aromatic polycarbonate with an intensity of fluorescent light of a specific level or below, thus having suppressed thermal decomposition and mechanical decomposition of the polymer, that the value obtained by dividing the shear rate at stirring (1/sec) of the stirring blade of the polymerization vessel by the square of the radius of the blade (cm) be controlled between 0.1 and 0.001 (unit: 1/sec×cm²), wherein the shear rate at stirring defined by shear rate at stirring (1/sec)=(circumferential speed of the blade (cm/sec))/(the width of the gap between the reactor and the blade (cm)).

Regarding the catalyst system for the production of these aromatic polycarbonates, the transesterification reaction can proceed in an industrially advantageous state, the generation of branched structure in a polycarbonate can be suppressed and a polycarbonate having good fluidity and color tone can be produced, by using a basic nitrogen compound and/or a basic phosphorus compound in combination with an alkali metal compound and limiting the amount of the alkali metal compound to $5.0 \times 10^{-6}$ chemical equivalent or below in terms of alkali metal based on 1 mol of bisphenol A.

In the specification of the present patent application, the ratio of the alkali metal compound, the nitrogen-containing basic compound, etc., to the charged aromatic dihydroxy compound (e.g. bisphenol A) is expressed e.g. by "W (numerical value) chemical equivalent in terms of (alkali) metal or basic nitrogen atom based on 1 mol of an aromatic dihydroxy compound (e.g. bisphenol A)". This means that the amount corresponds to W mol if the number of sodium atom is one as in the case of sodium phenoxide or 2,2-bis (4-hydroxyphenyl)propane monosodium salt, or one basic nitrogen as in the case of triethylamine.

The alkali metal compound to be used as the catalyst is, for example, a hydroxide, a bicarbonate, a carbonate, an acetate, a nitrate, a nitrite, a sulfite, a cyanate, a thiocyanate, a stearate, a borohydride, a benzoate, a hydrogen phosphate, a bisphenol salt or a phenol salt of alkali metals.

Concrete examples of the compounds are sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium nitrate, potassium nitrate, lithium nitrate, sodium nitrite, potassium nitrite, lithium nitrite, sodium sulfite, potassium sulfite, lithium sulfite, sodium cyanate, potassium cyanate, lithium cyanate, sodium thiocyanate, potassium thiocyanate, lithium thiocyanate, sodium stearate, potassium stearate, lithium stearate, sodium borohydride, potassium borohydride, lithium borohydride, sodium phenylborate, sodium benzoate, potassium benzoate, lithium benzoate, disodium hydrogen phosphate, dipotassium hydrogen phosphate, dilithium hydrogen phosphate, disodium salt, dipotassium salt or dilithium salt of bisphenol A, sodium salt, potassium salt or lithium salt of phenol, etc.

The alkali metal compound is usable as a catalyst preferably in the range of $5 \times 10^{-6}$ to $5.0 \times 10^{-6}$ chemical equivalent in terms of alkali metal based on 1 mol of the aromatic dihydroxy compound. Use of the alkali metal compound in an amount out of the above range is undesirable, having an adverse effect on various properties of the produced polycarbonate and causing failure in producing a high molecular weight polycarbonate through insufficient progress of the transesterification reaction.

Examples of the basic nitrogen compound to be used as a catalyst are ammonium hydroxides having an alkyl group, an aryl group, an alkylaryl group, etc., such as tetramethylammonium hydroxide ($Me_4NOH$), tetraethylammonium hydroxide ($Et_4NOH$), tetrabutylammonium hydroxide ($Bu_4NOH$), benzyltrimethylammonium hydroxide ($\phi$—$CH_2(Me)_3NOH$) and hexadecyltrimethylammonium hydroxide, tertiary amines such as triethylamine, tributylamine, dimethylbenzylamine and hexadecyldimethylamine, and basic salts such as tetramethylammonium borohydride ($Me_4NBH_4$), tetraethylammonium borohydride ($Bu_4NBH_4$), tetrabutylammonium tetraphenylborate ($Me_4NBPh_4$) and tetrabutylammonium tetraphenylborate ($Bu_4NBPh_4$).

Concrete examples of basic phosphorus compounds are phosphonium hydroxides having an alkyl group, an aryl group, an alkylaryl group, etc., such as tetramethylphosphonium hydroxide ($Me_4POH$), tetraethylphosphonium hydroxide ($Et_4POH$), tetrabutylphosphonium hydroxide ($Bu_4POH$), benzyltrimethylphosphonium hydroxide ($\phi$—$CH_2(Me)_3POH$) and hexadecyltrimethylphosphonium hydroxide and basic salts such as tetramethylphosphonium borohydride ($Me_4PBH_4$), tetrabutylphosphonium borohydride ($Bu_4PBH_4$), tetrabutylphosphonium tetraphenylborate ($Bu_4PBPh_4$) and tetramethylphosphonium tetraphenylborate ($MePBPh_4$).

The above basic nitrogen compound and/or basic phosphorus compound are used preferably in an amount of $1 \times 10^{-5}$ to $5 \times 10^{-4}$ chemical equivalent of the basic nitrogen atom and/or the basic phosphorus atom in the basic nitrogen compound and/or the basic phosphorus compound based on 1 mol of the aromatic dihydroxy compound. The ratio is more preferably $2 \times 10^{-5}$ to $5 \times 10^{-4}$ chemical equivalent and especially preferably $5 \times 10^{-5}$ to $5 \times 10^{-4}$ chemical equivalent on the same basis.

In the present invention, (a) an alkali metal salt of an ate complex of a group 14 element of the periodic table or (b) an alkali metal salt of an oxo acid of a group 14 element of the periodic table may be used by choice as the alkali metal compound for the catalyst. Here, the group 14 element of the periodic table means silicon, germanium or tin.

Use of such alkali metal compound as a polycondensation reaction catalyst has an advantage of rapid and sufficient progress of the polycondensation reaction. Further, undesirable side reactions such as branching reaction during the polycondensation reaction can be suppressed to a low level.

To be particular, the alkali metal salts (a) of the ate complex of a group 14 element of the periodic table are those described in JP-A 7-268091 and specific examples are germanium (Ge) compounds such as $NaGe(OMe)_5$, $NaGe(OEt)_5$, $NaGe(OPr)_5$, $NaGe(OBu)_5$, $NaGe(OPh)_5$, $LiGe(OMe)_5$, $LiGe(OBu)_5$ and $LiGe(OPh)_5$.

Examples of the tin (Sn) compounds are $NaSn(OMe)_3$, $NaSn(OMe)_2(OEt)$, $NaSn(OPr)_3$, $NaSn(O-n-C_6H_{13})_3$, $NaSn(OMe)_5$, $NaSn(OEt)_5$, $NaSn(OBu)_5$, $NaSn(O-n-C_{12}H_{25})_5$, $NaSn(OEt)$, $NaSn(OPh)_5$ and $NaSnBu_2(OMe)_3$.

Preferable examples of the alkali metal salts (b) of the oxo acid of the group 14 element of the periodic table are an alkali metal salt of silicic acid, an alkali metal salt of stannic acid, an alkali metal salt of germanium (II) acid (germanous acid) and an alkali metal salt of germanium (IV) acid (germanic acid).

The alkali metal salt of silicic acid is, for example, an acidic or neutral alkali metal salt of monosilicic acid or its condensation product such as monosodium orthosilicate, disodium orthosilicate, trisodium orthosilicate and tetrasodium orthosilicate.

The alkali metal salt of stannic acid is an acidic or neutral alkali metal salt of monostannic acid or its condensation product such as disodium monostannate ($NaSnO_3 \cdot xCH_2O$, x=0 to 5) and tetrasodium monostannate ($Na_4SnO_4$).

The alkali metal salt of germanium (II) acid (germanous acid) is e.g. an acidic or neutral alkali metal salt of monogermanous acid or its condensation product such as monosodium germanite ($NaHGeO_2$).

The alkali metal salt of germanium (IV) acid (germanic acid) is e.g. an acidic or neutral alkali metal salt of monogermanic acid or its condensation product such as monolithium orthogermanate ($LiH_3GeO_4$), disodium orthogermanate, tetrasodium orthogermanate, disodium digermanate ($Na_2Ge_2O_5$), disodium tetragermanate ($Na_2Ge_4O_9$) and disodium pentagermanate ($NaGe_5O_{11}$).

The amount of the above polycondensation reaction catalyst is preferably $5.0 \times 10^{-8}$ to $5.0 \times 10^{-6}$ chemical equivalent in terms of alkali metal element in the catalyst based on 1 mol of the aromatic dihydroxy compound and more preferably $5 \times 10^{-7}$ to $5 \times 10^{-6}$ chemical equivalent on the same basis.

The above catalyst may be used in the polycondensation reaction of the present invention as necessary in combination with at least one kind of cocatalyst selected from the group consisting of oxo acids of the group 14 element of the periodic table and oxides of the element.

Undesirable side reactions such as branching reaction liable to occur during the polycondensation reaction, formation of foreign materials and burn mark while in an apparatus during molding can be suppressed more effectively without giving an adverse effect on the terminal blocking reaction and the polycondensation reaction rate, by using these cocatalysts at a specific ration.

The oxo acids of the group 14 element of the periodic table are e.g. silicic acid, stannic acid and germanic acid.

The oxides of the group 14 element of the periodic table are, e.g. silicon monoxide, silicon dioxide, tin monoxide, tin dioxide, germanium monoxide, germanium dioxide and their condensation products.

The cocatalyst is used preferably at a ratio wherein not more than 50 mol (atom) of the group 14 metallic element of the periodic table of the cocatalyst exists based on 1 mol (atom) of the alkali metal element in the polycondensation reaction catalyst. Use of the cocatalyst at a metallic element ratio exceeding 50 mol (atom) is undesirable owing to the lowered polycondensation reaction rate.

More preferably, the cocatalyst is used at a ratio wherein 0.1 to 30 mol (atom) of the group 14 metallic element of the periodic table of the cocatalyst exists based on 1 mol (atom) of the alkali metal element in the polycondensation reaction catalyst.

Use of these catalyst systems as the catalyst for the polycondensation reaction and for the terminal blocking reaction to be described later will have an advantage of rapid and sufficient progress of the polycondensation reaction and the terminal blocking reaction. Undesirable side reactions such as branching reaction during the polycondensation reaction can also be suppressed to a low level.

The aromatic polycarbonate in the present invention means an aromatic polycarbonate produced from an aromatic dihydroxy compound and a carbonic acid ester as main components, or a polycondensation polymer having a structure expressed by the following formula (3) as a main repeating unit.

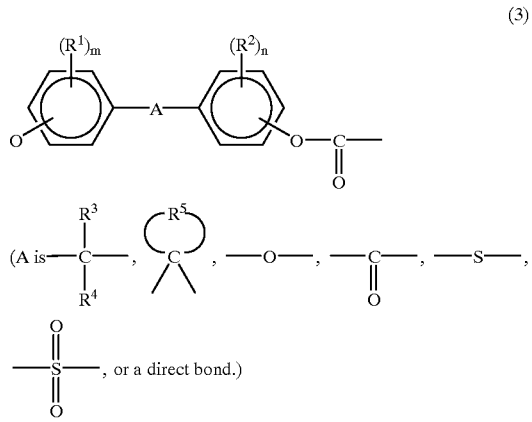

(3)

In the formula, $R^1$ and $R^2$ are each, same or different, a hydrogen atom, a halogen atom or a hydrocarbon group having a carbon number of from 1 to 12. The hydrocarbon group is preferably an aliphatic hydrocarbon group having a carbon number of from 1 to 12 or an aromatic hydrocarbon group having a carbon number of from 6 to 12. The halogen atom is preferably chlorine, bromine, iodine or the like.

In the formula, the terms m and n are each, same or different, a number selected from 0 and integers of 1 to 4.

The groups $R^3$ and $R^4$ of the group A in the above formula (3) are each, same or different, a halogen atom or a monovalent hydrocarbon group having a carbon number of from 1 to 12. The hydrocarbon group is, for example, an aliphatic hydrocarbon group having a carbon number of from 1 to 12 or an aromatic hydrocarbon group having a carbon number of from 6 to 12. The halogen atom is chlorine, bromine, iodine or the like.

The group $R^6$ is an alkylene group having a carbon number of from 3 to 8. Examples of the alkylene group are a pentylene group and a hexylene group.

The aromatic dihydroxy compound is preferably a compound expressed by the following general formula (4)

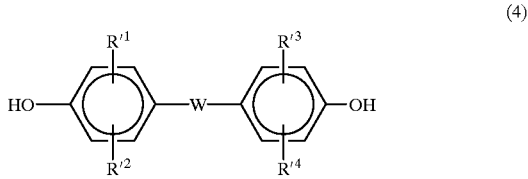

(4)

(wherein $R'^1$, $R'^2$, $R'^3$ and $R'^4$ are each independently a hydrogen atom, an alkyl group, an aralkyl group or an aryl group having a carbon number of from 1 to 12 or a halogen atom; W is an alkylidene group, an alkylene group, a cycloalkylidene group, a cycloalkylene group or a phenyl-substituted alkylene group having a carbon number of from 1 to 30, an oxygen atom, a sulfur atom, a sulfoxide group, a sulfone group or direct bond).

Concrete examples of the aromatic dihydroxy compound are bis(4-hydroxyphenyl)methane, 2,2-bis(4-hydroxyphenyl)propane, 2,2-bis(4-hydroxy-3-methylphenyl)propane, 4,4-bis(4-hydroxyphenyl)heptane, 2,2-bis(4-hydroxy-3,5-dichlorophenyl)propane, 2,2-bis(4-hydroxy-3,5-dibromophenyl)propane, bis(4-hydroxyphenyl) oxide, bis(3,5-dichloro-4-hydroxyphenyl) oxide, p,p'-dihydroxydiphenyl, 3,3'-dichloro-4,4'-dihydroxydiphenyl, bis(hydroxyphenyl)sulfone, resorcinol, hydroquinone, 1,4-dihydroxy-2,5-dichlorobenzene, 1,4-dihydroxy-3-methylbenzene, bis(4-hydroxyphenyl)sulfide and bis(4-hydroxyphenyl)sulfoxide. 2,2-bis(4-hydroxyphenyl)propane is especially preferable among the above examples.

Concrete examples of the carbonic acid ester are diphenyl carbonate, ditolyl carbonate, bis(chlorophenyl) carbonate, m-cresyl carbonate, dinaphthyl carbonate, bis(diphenyl) carbonate, dimethyl carbonate, diethyl carbonate, dibutyl carbonate and dicyclohexyl carbonate. Diphenyl carbonate is especially preferable among the above examples.

The polycarbonate of the present invention may contain the following components as required: aliphatic diols such as ethylene glycol, 1,4-butanediol, 1,4-cyclohexanedimethanol and 1,10-decanediol; dicarboxylic acids such as succinic acid, isophthalic acid, 2,6-naphthalenedicarboxylic acid, adipic acid, cyclohexanecarboxylic acid and terephthalic acid; and oxy acids such as lactic acid, p-hydroxybenzoic acid and 6-hydroxy-2-naphthoic acid, etc.

The transesterification catalyst is preferably deactivated with a catalyst deactivation agent (catalyst inactivation agent), especially preferably a sulfonic acid derivative.

The sulfonic acid derivative to be used in the present invention is preferably a sulfonic acid salt compound, a sulfonic acid or a lower ester of a sulfonic acid, with specific structures. The compounds expressed by the following general formulas (I) to (IV) are preferable as the sulfonic acid salt compound. The sulfonic acid and the lower ester of sulfonic acid are, for example, aromatic sulfonic acids such as benzenesulfonic acid and p-toluenesulfonic acid, aliphatic sulfonic acids such as dodecylsulfonic acid, hexadecylsulfonic acid and nonylsulfonic acid, or methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate, phenyl p-toluenesulfonate, methyl dodecylsulfonate, ethyl hexadecylsulfonate, propyl nonylsulfonate and butyl decylsulfonate. Sulfonic acid ester compounds are preferable to simple sulfonic acids.

The stability of melt viscosity of a polycarbonate resin can be suppressed to 0.5% or below by using the catalyst deactivation agent in an amount of 0.7 to 100 chemical equivalent, preferably 0.8 to 30 chemical equivalent, further preferably 0.9 to 20 chemical equivalent and especially preferably 0.9 to 10 chemical equivalent for a sulfonic acid salt compound or 0.7 to 20 chemical equivalent, preferably 0.8 to 10 chemical equivalent and more preferably 0.9 to 5 chemical equivalent for a sulfonic acid or a lower ester of a sulfonic acid compound based on 1 chemical equivalent of the alkali metal element of the remaining basic alkali metal compound, that is the remaining basic alkali metal compound catalyst, in a polycarbonate produced, specially by the melt-polymerization method or solid-phase polymerization method. In the case of using a sulfonic acid or a lower ester of a sulfonic acid compound, the polycarbonate resin is preferably subjected to an evacuation treatment after the catalyst deactivation treatment. Any treating equipment can be used in the evacuation treatment independent of the type of the equipment. The evacuation treatment is not necessary in the case of using a sulfonic acid salt compound.

The evacuation treatment can be performed with a vertical tank reactor, a horizontal tank reactor or a vented single-screw or twin-screw extruder under a vacuum of 0.05 to 60 mmHg, preferably 0.05 to 100 mm Hg.

The time for the evacuation treatment is 5 minutes to 3 hours for a tank reactor and about 5 seconds to 15 minutes for a twin-screw extruder, and the treating temperature is 240 to 350° C. The evacuation treatment may be carried out simultaneously with the pelletization by using an extruder. The residual raw material monomer existing in the polymer can be decreased or completely eliminated by the above evacuation treatment.

The polycarbonate resin produced by the above process has excellent moldability and retention stability and especially good thermal and color stability and is suitable for achieving the object of the present invention.

The aromatic polycarbonate produced by using a transesterification catalyst can be stabilized by this method and further stabilized by the combined use of a phosphorous acid compound and a hindered phenol compound.

Explanation of the sulfonic acid derivative of formulas (I) to (IV)

(I)

[in the formula, $A^1$ is an m-valent hydrocarbon group having a carbon number of from 1 to 30 which may have a substituent, $Y^1$ is a single bond or an oxygen atom, $X^1$ is a secondary or tertiary monovalent hydrocarbon group having a carbon number of from 2 to 30 or 1 equivalent of metallic cation, ammonium cation or phosphonium cation, and m is an integer of 1 to 4. All of the m $X^1$ groups are not 1 equivalent of metallic cation at the same time when $Y^1$ is a single bond],

(II)

[in the formula, $A^1$ is a divalent hydrocarbon group having a carbon number of from 1 to 30, $^+X^2$ is a secondary to quaternary ammonium cation or a secondary to quandary phosphonium cation, and the definition of $Y^1$ is the same as above],

(III)

[in the formula, $A^3$ is an n-valent hydrocarbon group having a carbon number of from 1 to 30, $^+X^3$ is a secondary to quanternary ammonium cation or a secondary to quanternary phosphonium cation, R is a monovalent hydrocarbon group having a carbon number of from 1 to 30, n is an integer of 2 to 4, and the definition of $Y^1$ is the same as above], and

(IV)

[in the formula, $A^5$ is a monovalent or divalent hydrocarbon group having a carbon number of from 1 to 30, $A^4$ is a divalent hydrocarbon group having a carbon number of from 1 to 30, $Ad^1$ and $Ad^2$ are each, same or different, an acid anhydride group selected from the group consisting of $-SO_2-O-SO_2-$, $-SO_2-O-CO-$ and $-CO-O-SO_2-$, and k is 0 to 1 provided that when k is zero, $-(Ad^2-A^5)_k$ is a hydrogen atom or a bond bonding the group $A^4$ and the group $A^5$ (in this case, $A^5$ is a divalent hydrocarbon group having a carbon number of from 1 to 30 or a single bond).

Detailed explanation of the sulfonic acid derivative of formula (I)

(I)

In the formula, $A^1$ is an m-valent hydrocarbon group having a carbon number of from 1 to 30 which may have a substituent, $Y^1$ is a single bond or an oxygen atom, $X^1$ is a secondary or tertiary monovalent hydrocarbon group having a carbon number of from 2 to 30 or 1 equivalent tertiary of metallic cation, ammonium cation or phosphonium cation, and m is an integer of 1 to 4. All of m $X^1$ groups are not 1 equivalent of metallic cation at the same time when $Y^1$ is a single bond.

The secondary or tertiary monovalent hydrocarbon group having a carbon number of from 2 to 30 is preferably a secondary or tertiary alkyl group having a carbon number of from 2 to 30, expressed e.g. by the following formula (I)-d

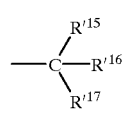
(I)-d

[in the formula, $R'^{15}$ is a hydrogen atom or an alkyl group having a carbon number of from 1 to 5, $R'^{16}$ is a hydrogen atom, a phenyl group or an alkyl group having a carbon number of from 1 to 5, and $R'^{17}$ is the same as or different from $R'^{15}$ the definition being the same as that of $R'^{15}$, wherein two groups selected from $R'^{15}$, $R'^{16}$ and $R'^{17}$ are not hydrogen atoms at the same time]. Especially preferable groups among the above groups are those wherein $R'^{15}$ and $R'^{17}$ are each, same or different, a hydrogen atom, a methyl group, an ethyl group or a propyl group and $R'^{16}$ is a methyl group or a phenyl group.

In the capacity of one capacity of one equivalent of metallic cation can be enumerated are, for example, a cation of an alkali metal such as lithium, sodium or potassium, ½ of cation of an alkaline earth metal such as calcium or barium, or ⅓ of a trivalent metal such as aluminum.

The ammonium cation is e.g. a cation expressed by the following formula (I)-a

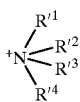
(I)-a

[in the formula, $R'^1$, $R'^2$, $R'^3$ and $R'^4$ are each independently a hydrogen atom or a monovalent hydrocarbon group having a carbon number of from 1 to 30.

In the formula (I)-a the monovalent hydrocarbon groups represented by the groups $R'^1$, etc., are preferably an alkyl group having a carbon number of from 1 to 20, an aryl group having a carbon number of from 6 to 10, an aralkyl group having a carbon number of from 7 to 10, etc.

The phosphonium cation is e.g. a cation expressed by the following formula (I)-b.

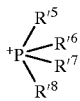
(I)-b

[in the formula, $R'^5$, $R'^6$, $R'^7$ and $R'^8$ are each independently hydrogen atom or a monovalent hydrocarbon group having a carbon number of from 1 to 30].

In the formula (I)-b, the monovalent hydrocarbon groups represented by the groups $R'5$, etc., are e.g. the same as the monovalent hydrocarbon groups exemplified in the formula (I)-a.

In the formula (I), the group $X^1$ is preferably a secondary or tertiary alkyl group having a carbon number of from 3 to 30, an alkali metal cation, a cation expressed by the above formula (I)-a or a cation expressed by the above formula (I)-b. Also in the above formula (I), m is an integer of 1 to 4, preferably 1 or 2.

Concrete examples of the compound expressed by the above formula (I) are, 2-phenyl-2-propyl dodecylbenzenesulfonate, 2-phenyl-2-butyl dodecylbenzenesulfonate, octylsulfonic acid tetrabutylphosphonium salt, decylsulfonic acid tetrabutylphosphonium salt, benzenesulfonic acid tetrabutylphosphonium salt, dodecylbenzenesulfonic acid tetraethylphosphonium salt, dodecylbenzenesulfonic acid tetrabutylphosphonium salt, dodecylbenzenesulfonic acid tetrahexylphosphonium salt, dodexylbenzenesulfonic acid tetraethylphosphonium salt, dodecylbenzenesulfonic acid tetrabutylphosphonium salt, dodecylbenzenesulfonic acid tetrahexylphosphonium salt, dodecylbenzenesulfonic acid tetraethylphosphonium salt, decylammonium butyl sulfate, decylammonium decyl sulfate, dodecylammonium methyl sulfate, dodecylammonium ethyl sulfate, dodecylmethylammonium methyl sulfate, dodecyldimethylammonium tetradecyl sulfate, tetradecyldimethylammonium methyl sulfate, tetramethylammonium hexyl sulfate, decyltrimethylammonium hexadecyl sulfate, tetrabutylammonium dodecylbenzyl sulfate, tetraethylammonium dodecylbenzyl sulfate and tetramethylammonium dodecylbenzyl sulfate.

Detailed explanation of the sulfonic acid derivative of formula (II)

(II)

In the formula, $A^2$ is a divalent hydrocarbon group having a carbon number of from 1 to 30, $^+X^2$ is a secondary to quanternary ammonium cation of phosphonium cation, and the definition of $Y^1$ is the same as mentioned above. In the above formula (II), the divalent hydrocarbon group having a carbon number of from 1 to 30 represented by the group $A^2$ is preferably a divalent saturated aliphatic hydrocarbon group. A saturated aliphatic hydrocarbon group having a carbon number of from 1 to 20 is more preferable.

To group $^+X^2$ is ammonium cation or phosphonium cation. The ammonium cation is preferably a cation expressed by the following formula (II)-a

(II)-a

[in the formula, $R'^9$, $R'^{10}$ and $R'^{11}$ are each independently a hydrogen group having a carbon number of from 1 to 30].

Those which are the same as the groups exemplified in the above formula (I)-a can be used as examples of the monovalent hydrocarbon groups having a carbon number of from 1 to 30 represented by the groups $R'^9$, etc.

The phosphonium cation is preferably a cation expressed by the following formula (II)-b

(II)-b

[in the formula, $R'^{12}$, $R'^{13}$ and $R'^{14}$ are each independently a hydrogen atom or a monovalent hydrocarbon group having a carbon number of from 1 to 30]. Those which are the same as the groups exemplified in the above formula (I)-b can be used as examples of the monovalent hydrocarbon groups having a carbon number of from 1 to 30 represented by the groups $R'^{12}$, etc.

The following compounds are concrete examples of the compounds expressed by the above formula (II).

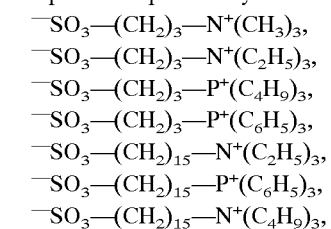

Detailed explanation of the sulfonic acid derivative of formula (III)

(III)

In the formula, $A^3$ is and n-valent hydrocarbon group having a carbon number of from 1 to 30, $^+X^3$ is an ammonium cation or a phosphonium cation, R is a monovalent hydrocarbon group having a carbon number of from 1 to 30, n is an integer of 2 to 4, and the definition of $Y^1$ is the same as above.

The n-valent hydrocarbon group having a carbon number of from 1 to 30 and representing the group $A^3$ is preferably e.g. an n-valent saturated aliphatic hydrocarbon group.

Those described in the above formulas (II)-a and (II)-b can be used as examples of the ammonium cations and the phosphonium cations of the group $^+X^3$.

The group R is a monovalent hydrocarbon group and its preferable examples are alkyl groups, aryl groups and aralkyl groups. The preferable carbon number is 1 to 20 for the alkyl group, 6 to 20 for the aryl group and 7 to 20 for the aralkyl group.

The term n is 2, 3 or 4, and the definition of the group $Y^1$ is the same as above, i.e. a single bond or an oxygen atom.

Following compounds are concrete examples of the compound expressed by the above formula (III).

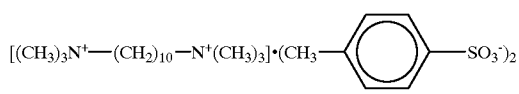

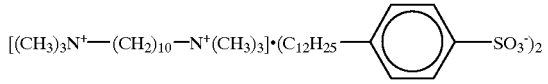

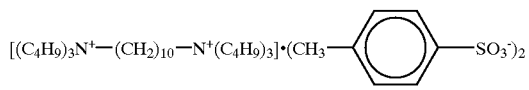

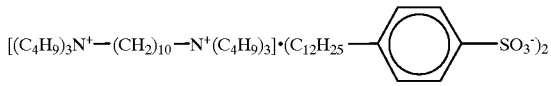

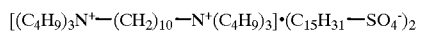

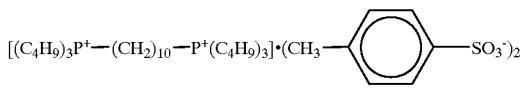

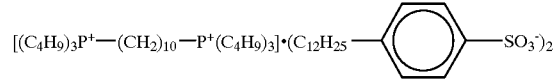

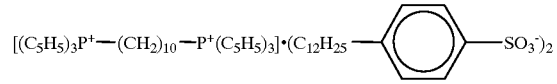

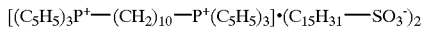

Detailed explanation of the sulfonic acid derivative of formula (IV)

$$A^5\text{—}Ad^1\text{—}A^4\text{—}(Ad^2\text{—}A^5)_k \qquad (IV)$$

In the formula, $A^5$ is a monovalent or divalent hydrocarbon group having a carbon number of from 1 to 30, $A^4$ is a divalent hydrocarbon group having a carbon number of from 1 to 30, $Ad^1$ and $Ad^2$ are, same or different, an acid anhydride group selected from the group consisting of —$SO_2$—O—$SO_2$—, —$SO_2$—O—CO— and —CO—O—$SO_2$—, and k is 0 for 1. When k is zero, the group —$(Ad^2$—$A^5)_k$ is a hydrogen atom or a bond bonding the group $A^4$ and the group $A^5$ (in this case, $A^5$ is divalent hydrocarbon group or a single bond).

The following compounds are concrete examples of the compound expressed by the above formula (IV).

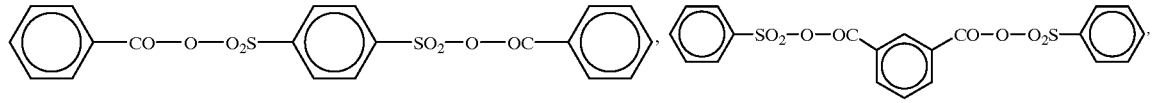

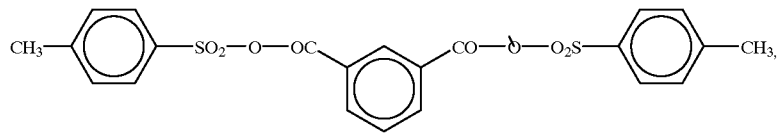

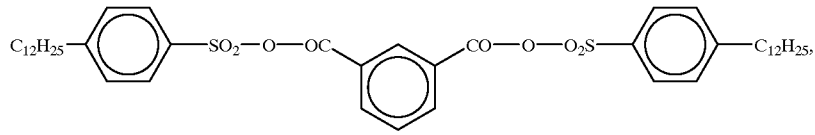

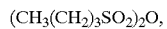

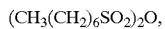

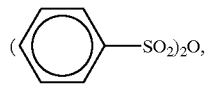

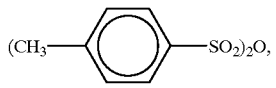

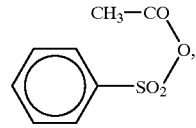

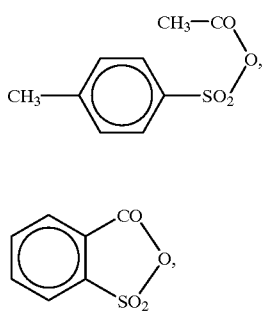

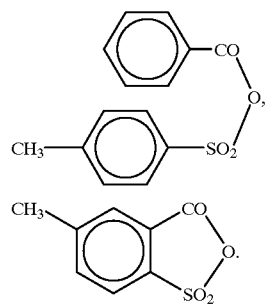

Among the sulfonic acid derivatives of the above formulas (I) to (IV), a phosphonium salt-type or ammonium salt-type sulfonic acid derivative is especially stable by itself even at 200° C. or over, and the sulfonic acid derivative can give the objective polymer by rapidly neutralizing the catalyst when added to the polymer.

The ratio of the sulfonic acid derivative to the alkali metal transesterification catalyst is preferably 0.5 to 50 mol per 1 mol of the transesterification catalyst.

There is no particular restriction to the method to add the sulfonic acid derivative to the polymer after the polycondensation of the terminal blocking treatment. For example, the compound may be added to the polycarbonate after pelletization and remelting.

The reaction formula to form an aromatic polycarbonate in the production of an aromatic polycarbonate using e.g. bisphenol A (BPA) as the aromatic dihydroxy compound and diphenyl carbonate DPC) as the carbonic acid diester is, as stated before, expressed by viscosity after an aging test in which the specimen is herd at 250° C. for 15 hours.

In this sense, it is required that the ratio of the terminal hydroxy group to the total molecular terminals of a polycarbonate of the present invention is restricted within the range of 0 to 25 mol %.

Thus, although, in the case of the phosgene method, the OH terminal concentration inevitably falls within the above range by he terminal blocking agent used as a molecular weight modifier, it is necessary to take a special measure for decreasing the OH terminal group in the case of the melt-polymerization method or the solid-phase polymerization method in which a lot of OH terminal groups are generated owing to the reaction process characteristics.

It is well known that the above objective can be achieved e.g. by the following conventional methods.

1) control of molar ratio of charged polymerization raw materials; the DPC/BPA molar ratio at the charging of the raw materials for the polymerization reaction is

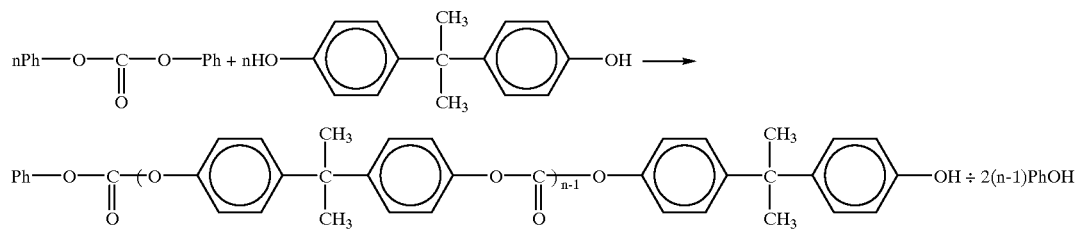

The PhOH (phenol) in the above formula is removed from the system by evacuation treatment, etc., to form an aromatic polycarbonate expressed by the following formula.

increased e.g. to a level between 1.03 and 1.10 taking into consideration the characteristics of the polymerization reactor, or

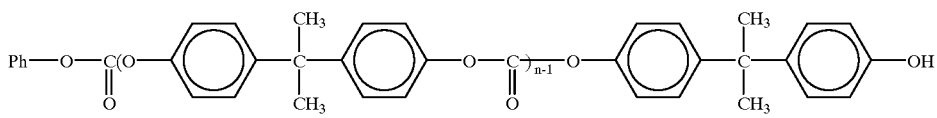

One terminal of the polycarbonate molecule expressed by the above formula has an aromatic hydroxy group.

It is also a known fact that a terminal aromatic hydroxy group has undesirable effect on the short-term and long-term stability when an aromatic polycarbonate is subjected to heating. For example, JP-A61-87724 and JP-A61-87725 (General Electric) describe that the decrease of the terminal hydroxy group can improve the stability of the polymer, which is indicated by decrease of the lowering of intrinsic 2) Blocking of terminal group; the OH terminal group is blocked with an compound expressed by the formula (V) to be described below, at the ending point of the polymerization reaction according to a method, e.g., the method described in U.S. Pat. No. 5,696,222.

The amount of the compound represented by formula (V) is 0.8 to 10 mol, more preferably 0.8 to 5 mol, especially preferably 0.9 to 2 mol based on 1 chemical equivalent of the terminal OH group of the polymer before the blocking reaction. More than 80% of the terminal OH group of the polymer before the blocking reaction. More than 80% of the terminal OH groups can be suitably blocked by the addition of the compound at the above ratio. Use of a catalyst described in the above patent is preferable in performing the blocking reaction.

The object can be achieved by a process for the production of a terminal-blocked polycarbonate characterized by the addition of a compound expressed by the following formula(V)

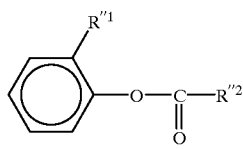

(V)

[in the formula, $R''^1$ is a chlorine atom, a methoxycarbonyl atom, a methoxycarbonyl group or an ethoxycarbonyl group, and $R''^2$ is an alkyl group having a carbon number of from 1 to 30, an alkoxy group having a carbon number of from 1 to 30, an aryl group having a carbon number of from 6 to 30 or an aryloxy group having a carbon number of from 6 to 30, wherein said a alkyl group having a carbon number of from 1 to 30 and alkoxy group having a carbon number of from 1 to 30 may have, as a substituent, methoxycarbonyl, ethosycarbonyl, (o-methoxycarbonylphenyl)oxycarbonyl or (o-ethoxycarbonylphenyl)oxycarbonyl, and said aryl group having a carbon number of from 6 to 30 and aryloxy group having a carbon number of from 6 to 30 may have, as a substituent, methoxycarbonyl, ethoxycarbonyl, (o-methoxycarbonylphenyl)oxycarbonyl, (o-ethoxycarbonylphenyl)oxycarbonyl, an alkyl group having a carbon number of from 1 to 30 or an alkoxy group having a carbon number of from 6 to 30 when the intrinsic viscosity of the polycarbonate reaches at least 0.3 dl/g, thereby forming a terminal-blocked polycarbonate having an intrinsic viscosity change, during the addition, of 0.1 dl/g or less based on the intrinsic viscosity at the time of addition, and a terminal hydroxy group content of 0 to 30 mol %.

The compound expressed by the above formula (V) used in the present invention includes carbonates and carboxylic acid esters according to the definition of the group $R''^2$.

In the formula (V), $R''hu 1$is a chlorine atom, a methoxycarbonyl group ($CH_3OCO$—) or an ethoxycarbonyl group ($C_2H_5OCO$—). A chlorine atom and a methoxy carbonyl group are preferable and a methoxycarbonyl group is especially preferable among the above groups.

$R''^2$ is an alkyl group having a carbon number of from 1 to 30, an alkoxy group having a carbon number of from 1 to 30, an aryl group having a carbon number of from 6 to 30 or an aryloxy group having a carbon number of from 6 to 30.

The alkyl group having a carbon number of from 1 to 30 may be a straight-chain group, a branched chain group or a cyclic group or may have an unsaturated group. Examples of such alkyl groups are straight-chain alkyl groups such as a methyl group, an ethyl group, an n-propyl group, an n-butyl group, an n-pentyl group, an n-hexyl group, an n-octyl group, an n-nonyl group, an n-dodecanyl group, an n-lauryl group, an n-palmityl group or stearyl group, branched alkyl groups such as an isopropyl group, a t-butyl group or a 4-butylnonyl group, alkyl groups having unsaturated groups ((alkenyl groups) such as an allyl group, a butenyl group, a pentenyl group, a hexenyl group, a dodecanyl group or oleyl group, a cycloalkyl groups such as cyclopentyl group or cyclohexyl group, etc. Long-chain alkyl groups, concretely a lauryl group, a stearyl group and dodecanyl group are especially preferable among the above groups from the viewpoint of the improvement of the mold releasability of the polymer.

The alkoxy group having a carbon number of from 1 to 30 may be a straight-chain group, a branched chain group or a cyclic group. It may have an unsaturated group, too. Examples of such alkoxy groups are straight-chain alkoxy groups such as a methoxy group, an ethoxy group, an n-propoxy group, an n-butoxy group, an n-pentoxy group, an n-hexoxy group, an n-octoxy group, an n-nonyloxy group, an n-decanyloxy group, an n-lauryloxy group, an n-palmityloxy group or a stearoyloxy group, branched chain alkoxy groups having unsaturated groups such as an allyloxy group, a butenyloxy group, a pentenyloxy group, a hexenyloxy group, a dodecenyloxy group or an oleyloxy group, cycloalkyloxy groups such as a lauryloxy group, a stearoyloxy group and a dodecenyloxy group are especially preferable among the above groups from the viewpoint of the improvement of the mold-releasability of the polymer.

The above alkyl group having a carbon number of from 1 to 30 and the alkoxy group having a carbon number of from 1 to 30 may have, as a substituent, methoxycarbonyl ethoxycarbonyl, (o-methoxycarbonylphenyl)oxycarbonyl

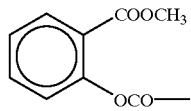

or (o-ethoxycarbonylphenyl)oxycarbonyl.

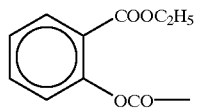

The aryl group having a carbon number of from 6 to 30 is, for example, phenyl, naphthyl, biphenyl and anthranyl.

The aryloxy group having a carbon number of from 6 to 30 is, for example, phenoxy, naphtoxy, biphenyloxy and anthranyloxy.

These aryl groups having a carbon number of from 6 to 30 and aryloxy groups having a carbon number of from 6 to 30 may have, as a substituent, methoxycarbonyl, ethoxycarbonyl, (o-methoxycarbonylphenyl)oxycarbonyl, (o-ethoxycarbonylphenyl)oxycarbonyl, an alkyl group having a carbon number of from 1 to 30 or an alkoxy group having a carbon number of from 1 to 30. Those which are the same as are exemplified above can be cited as examples of the alkyl substituent having a carbon number of from 1 to 30 and the alkoxy substituent having a carbon number of from 1 to 30.

the compound expressed by the above formula (V) is categorized for convenience, based on the definition of $R''^1$, into carbonate compounds expressed by the following formula (V)-1

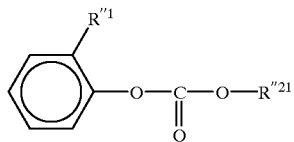

(V)-1

[in the formula, $R''^1$ is a chlorine atom, a methoxycarbonyl group or an ethoxycarbonyl group, $R''^{21}$ is an alkyl group having a carbon number of from 1 to 30 or an aryl group having a carbon number of 6 to 30, wherein the alkyl group having a carbon number of from 1 to 30 may have, as a substituent, methoxycarbonyl, ethoxycarbonyl, (o-methoxycarbonylphenyl)oxycarbonyl or (o-ethoxycarbonylphenyl)oxycarbonyl and the aryl group having a carbon number of from 6 to 30 may have, as a substituent, methoxycarbonyl, ethoxycarbonyl, (o-methoxycarbonylphenyl)oxycarbonyl, (o-ethoxycarbonylphenyl)oxycarbonyl, an alkyl group having a carbon number of from 1 to 30 or an alkoxy group having a carbon number of from 1 to 30] and carboxylic acid aryl esters expressed by the following formula (V)-2

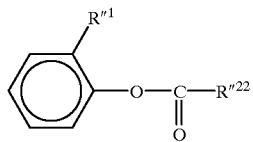

(V)-2

[in the formula, $R''^1$ is a chlorine atom, a methoxycarbonyl group or an ethoxycarbonyl group, $R''^{22}$ is an alkyl group having a carbon number of from 1 to 30 or an aryl group having a carbon number of 6 to 30, wherein the alkyl group having a carbon number of from 1 to 30 and the alkoxy group having a carbon number of from 1 to 30 may have, as a substituent, methoxycarbonyl, ethoxycarbonyl, (o-methoxycarbonylphenyl)oxycarbonyl, or (o-ethoxycarbonylphenyl)oxycarbonyl, and the aryl group having a carbon number of from 6 to 30 and the aryloxy group having a carbon number of from 6 to 30 may have, as a substituent methoxycarbonyl, ethoxycarbonyl, (o-methoxycarbonylphenyl)oxycarbonyl, (o-ethoxycarbonylphenyl)oxycarbonyl, an alkyl group having a carbon number of from 1 to 30 or an alkoxy group having a carbon number of from 1 to 30].

Examples of the carbonate compounds expressed by the above formula (V)-1 are 2-chlorophenyl aryl carbonate such as 2-chlorophenyl phenyl carbonate, 2-chlorophenyl 4'-methylphenyl carbonate, 2-chlorophenyl 4'-ethylphenyl carbonate, 2-chlorophenyl 4'-n butylphenyl carbonate, 2-chlorophenyl 4'-t-butylphenyl carbonate, 2-chlorophenyl 4'-nonylphenyl carbonate, 2-chlorophenyl 4'-cumyl carbonate, 2-chlorophenyl naphthyl carbonate, 2-chlorophenyl 4'-methoxyphenyl carbonate, 2-chlorophenyl 4'-ethoxyphenyl carbonate, 2-chlorophenyl 4'-n-butoxyphenyl carbonate, 2-chlorophenyl 4'-t-butoxyphenyl carbonate, 2-chlorophenyl 4'-nonyloxyphenyl carbonate, 2-chlorophenyl 4'-t-propyloxyphenyl carbonate, 2-chlorophenyl 2'-methoxycarbonylphenyl carbonate, 2-chlorophenyl 4'-methoxycarbonylphenyl carbonate, 2-chlorophenyl 2'-ethoxycarbonylphenyl carbonate, 2-chlorophenyl 4'-ethoxycarbonylphenyl carbonate, 2-chlorophenyl 2'-(o-methoxycarbonylphenyl) oxycarbonylphenyl carbonate or 2-chlorophenyl 2'-(o-ethoxycarbonylphenyl)oxycarbonylphenyl carbonate;

2-chlorophenyl alkyl carbonates such as 2-chlorophenyl methyl carbonate, 2-chlorophenyl ethyl carbonate, 2-chlorophenyl octyl carbonate, 2-chlorophenyl i-propyl carbonate, 2-chlorophenyl 2-methoxycarbonylethyl carbonate, 2-chlorophenyl 2-ethoxycarbonylethyl carbonate, or 2-chlorophenyl 2-(o-ethoxycarbonylphenyl) oxycarbonylethyl carbonate;

2-methoxycarbonylphenyl aryl carbonates such as 2-methoxycarbonylphenyl phenyl carbonate, 2-methoxycarbonylphenyl methylphenyl carbonate, 2-methoxycarbonylphenyl ethylphenyl carbonate, 2-methoxycarbonylphenyl propylphenyl carbonate, 2-methoxycarbonylphenyl n-butylphenyl carbonate, 2-methoxycarbonylphenyl t-butylphenyl carbonate, 2-methoxycarbonylphenyl hexylphenyl carbonate, 2-methoxycarbonylphenyl nonylphenyl carbonate, 2-methoxycarbonylphenyl dodecylphenyl carbonate, 2-methoxycarbonylphenyl hexadecylphenyl carbonate, 2-methoxycarbonylphenyl di-n-butylphenyl carbonate, 2-methoxycarbonylphenyl di-t-butylphenyl carbonate, 2-methoxycarbonylphenyl dinonylphenyl carbonate, 2-methoxycarbonylphenyl cyclohexyphenyl carbonate, 2-methoxycarbonylphenyl naphthylphenyl carbonate, 2-methoxycarbonylphenyl biphenyl carbonate, 2-methoxycarbonylphenyl cumylphenyl carbonate, 2-methoxycarbonylphenyl 4'-methoxyphenyl carbonate, 2-methoxycarbonylphenyl 4'-ethoxyphenyl carbonate, 2-methoxycarbonylphenyl 4'-n-butoxyphenyl carbonate, 2-methoxycarbonylphenyl 4'-t-butoxyphenyl carbonate, 2-methoxycarbonylphenyl 4'-nonyloxyphenyl carbonate, 2-methoxycarbonylphenyl 4'-cumyloxyphenyl carbonate, di-2-(methoxycarbonylphenyl) carbonate, 2-methoxycarbonylphenyl 4'-methoxycarbonylphenyl carbonate, 2-methoxycarbonylphenyl 2'-ethoxycarbonylphenyl carbonate, 2-methoxycarbonylphenyl 4'-ethoxycarbonylphenyl carbonate, 2-methoxycarbonylphenyl 2'-(o-methoxycarbonylphenyl)oxycarbonylphenyl carbonate, or 2-methoxycarbonylphenyl 2'-(o-ethoxycarbonylphenyl) oxycarbonylphenyl carbonate;

2-methoxycarbonylphenyl alkyl carbonates such as 2-methoxycarbonylphenyl methyl carbonate, 2-methoxycarbonyphenyl ethyl carbonate, 2-methoxycarbonylphenyl n-butyl carbonate, 2-methoxycarbonylphenyl octyl carbonate, 2-methoxycarbonylphenyl nonyl carbonate, 2-methoxycarbonylphenyl cetyl carbonate, 2-methoxycarbonylphenyl lauryl carbonate, 2-methoxycarbonylphenyl 2-methoxycarbonylethyl carbonate, 2-methoxycarbonylphenyl 2-ethoxycarbonylethyl carbonate, 2-methoxycarbonylphenyl 2-(o-methoxycarbonylphenyl) oxycarbonylethyl carbonate or 2-methoxycarbonylphenyl 2-(o-ethoxycarbonylphenyl)oxycarbonylethyl carbonate;

2-ethoxycarbonylphenyl aryl carbonates such as 2-ethoxycarbonylphenyl phenyl carbonate, 2-ethoxycarbonylphenyl methylphenyl carbonate, 2-ethoxycarbonylphenyl ethylphenyl carbonate, 2-ethoxycarbonylphenyl propylphenyl carbonate, 2-ethoxycarbonylphenyl n-butylphenyl carbonate, 2-ethoxycarbonylphenyl t-butylphenyl carbonate, 2-ethoxycarbonylphenyl hexylphenyl carbonate, 2-ethoxycarbonylphenyl nonylphenyl carbonate, 2-ethoxycarbonylphenyl dodecylphenyl carbonate, 2-ethoxycarbonylphenyl hexadecylphenyl carbonate, 2-ethoxycarbonylphenyl di-n-butylphenyl carbonate,
2-ethoxycarbonylphenyl di-t-butylphenyl carbonate,
2-ethoxycarbonylphenyl di-t-butylphenyl carbonate,
2-ethoxycarbonylphenyl dinonylphenyl carbonate,
2-ethoxycarbonylphenyl cyclohexylphenyl carbonate,
2-ethoxycarbonylphenyl naphthylphenyl carbonate,
2-ethoxycarbonylphenyl biphenyl carbonate,
2-ethoxycarbonylphenyl cumylphenyl carbonate,
2-ethoxycarbonylphenyl 4'-methoxyphenyl carbonate,
2-ethoxycarbonylphenyl 4'-ethoxyphenyl carbonate,
2-ethoxycarbonylphenyl 4'-n-butoxyphenyl carbonate,
2-ethoxycarbonylphenyl 4'-t-butoxyphenyl carbonate,
2-ethoxycarbonylphenyl 4'-nonyloxyphenyl carbonate,
2-ethoxycarbonylphenyl 4'-cumyloxyphenyl carbonate,
di(2-ethoxycarbonylphenyl) carbonate,
2-ethoxycarbonylphenyl 4'-methoxycarbonylphenyl carbonate, 2-ethoxycarbonylphenyl 4'-ethoxycarbonylphenyl carbonate,
2-ethoxycarbonylphenyl 2'-(o-methoxycarbonylphenyl)oxycarbonylphenyl carbonate or 2-ethoxycarbonylphenyl 2'-(o-ethoxycarbonylphenyl)oxycarbonylphenyl carbonate; and 2-ethoxycarbonylphenyl alkyl carbonates such as 2-ethoxycarbonylphenyl methyl carbonate, 2-ethoxycarbonylphenyl ethyl carbonate, 2-ethoxycarbonylphenyl n-butyl carbonate, 2-ethoxycarbonylphenyl octyl carbonate, 2-ethoxycarbonylphenyl 2-methoxycarbonylethyl carbonate, 2-ethoxycarbonylphenyl 2-ethoxycarbonylethyl carbonate, 2-ethoxycarbonylphenyl 2-(o-methoxycarbonylphenyl) oxycarbonylethyl carbonate or 2-ethoxycarbonylphenyl 2-(o-ethoxycarbonyl-phenyl)oxycarbonylethyl carbonate. Among the above compounds, 2-methoxycarbonylphenyl phenyl carbonate is preferable because blocking of the terminal groups with phenyl groups gives excellent hydrolysis resistance (heat resistance on wetting).

Examples of the carboxylic acid aryl esters expressed by the above formula (V)-2 are aromatic carboxylic acid 2-chlorophenyl esters such as 2-clorophenyl benzoate, 2-chlorophenyl 4-methylbenzoate, 2-chlorophenyl 4-ethylbenzoate, 2-chlorophenyl 4-n-butylbenzoate, 2-chlorophenyl 4-t-butylbenzoate, 2-chlorophenyl 4-nonylbenzoate, 2-chlorophenyl 4-cumylbenzoate, 2-chlorophenyl naphthoate, 2-chlorophenyl 4-methoxybenzoate, 2-chlorophenyl 4-ethoxybenzoate, 2-chlorophenyl 4-n-butoxybenzoate, 2-chlorophenyl 4-t-butoxybenzoate, 2-chlorophenyl 4-nonyloxybenzoate, 2-chlorophenyl 4-cumloxybenzoate, 2-chlorophenyl 2-methoxycarbonylbenzoate, 2-chlorophenyl 4-methoxycarbonylbenzoate, 2-chlorophenyl 2-ethoxycarbonylbenzoate, 2-chlorophenyl 4-ethoxycarbonylbenzoate, 2-chlorophenyl 2-(o-methoxycarbonylphenyl)oxycarbonylbenzoate or 2-chlorophenyl 2-(o-ethoxycarbonylphenyl)oxycarbonylbenzoate;

aliphatic carboxylic acid 2-chlorophenyl esters such as 2-chlorophenyl acetate, 2-chlorophenyl propionate, 2-chlorophenyl valerate, 2-chlorophenyl pelargonate, 2-chlorophenyl 1-methylpropionate, 2-chlorophenyl 2-methoxycarbonylpropionate, 2-chlorophenyl 2-ethoxycarbonylbutyrate, 2-chlorophenyl 4'-(2-methoxycarbonylphenyl)oxycarbonylbutyrate or 2-chlorophenyl 4'-(2-methoxycarbonylphenyl) oxycarbonylbutyrate;

aromatic carboxylic acid (2'-methoxycarbonylphenyl) esters such as (2-methoxycarbonylphneyl) benzoate, (2'-methoxycarbonylphenyl) 4-methylbenzoate, (2'-methoxycarbonylphenyl) 4-ethylbenzoate, (2'-methoxycarbonylphenyl) 4-n-butylbenzoate, (2'-methoxycarbonylphenyl) 4-t-butylbenzoate, (2'-methoxycarbonylphenyl) naphthoate, (2'-methoxycarbonylphenyl) 4-nonylbenzoate, (2'-methoxycarbonylphenyl) 4-cumylbenzoate, (2'-methoxycarbonylphenyl) 4-methoxybenzoate, (2'-methoxycarbonylphenyl) 4-ethoxybenzoate, (2'-methoxycarbonylphenyl) 4-n-butoxybenzoate, (2'-methoxycarbonylphenyl) 4-t-butoxybenzoate, (2'-methoxycarbonylphenyl) 4-cumyloxybenzoate, (2'-methoxycarbonylphenyl 2-methoxycarbonylbenzoate, (2'-methoxycarbonylphenyl) 4-methoxycarbonylbenzoate, (2'-methoxycarbonylphenyl) 4-ethoxycarbonylbenzoate, (2'-methoxycarbonylphenyl 3-(o-methoxycarbonylphenyl)oxycarbonylbenzoate, (2'-methoxycarbonylphenyl) 4-(o-methoxycarbonylphenyl) oxycarbonylbenzoate or (2'-methoxycarbonylphenyl) 3-(o-ethoxycarbonylphenyl)oxycarbonylbenzoate; and aromatic carboxylic acid 2'-ethoxycarbonylphenyl esters such as 2-ethoxycarbonylphenyl benzoate, (2'-ethoxycarbonylphenyl) 4-methylbenzoate, (2'-ethoxycarbonylphenyl) 4-ethylbenzoate, (2'-ethoxycarbonylphenyl) 4-n-butylbenzoate, (2'-ethoxycarbonylphenyl) 4-t-butylbenzoate, (2'-ethoxycarbonylphenyl) naphthoate, (2'-ethoxycarbonylphenyl) 4-nonylbenzoate, (2'-ethoxycarbonylphenyl) 4-cumylbenzoate, (2'-ethoxycarbonylphenyl) 4-methoxybenzoate, (2'-ethoxycarbonylphenyl) 4-ethoxybenzoate, (2'-ethoxycarbonylphenyl) 4-n-butoxybenzoate, (2'-ethoxycarbonylphenyl) 4-t-butoxybenzoate, (2'-ethoxycarbonylphenyl) 4-nonyloxybenzoate, (2'-ethoxycarbonylphenyl) 4-cumyloxybenzoate, (2'-ethoxycarbonylphenyl) 2-methoxycarbonylbenzoate, (2'-ethoxycarbonylphenyl) 4-ethoxycarbonylbenzoate, (2'-ethoxycarbonylphenyl) 3-(o-methoxycarbonylphenyl) oxycarbonylbenzoate, (2'-ethoxycarbonylphenyl) 4-(o-methoxycarbonyl-phenyl)oxycarbonylbenzoate or (2'-ethoxycarbonylphenyl) 3-(o-methoxycarbonylphenyl) oxycarbonylbenzoate.

Especially preferable compounds expressed by the formula (V) are 2-methoxycarbonylphenyl benzoate, (2'-methoxycarbonylphenyl) 4-cumylbenzoate, 2-ethoxycarbonylphenyl benzoate and (2'-methoxycarbonylphenyl) 4-(o-methoxycarbonylphenyl) oxycarbonylbenzoate.

In the process of the present invention, the compound expressed by the above formula (V) is added to a polycarbonate and made to react with the terminal OH(—OH) of the polycarbonate to block the terminal of the polycarbonate according to the following reaction formula.

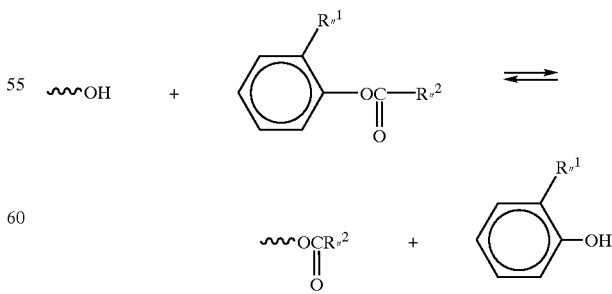

The reaction is preferably carried out together with distilling out of the produced 2-substituted phenol to quickly perform the terminal blocking reaction in high yield.

The compound expressed by the above formula (V) is added after the stage when the intrinsic viscosity of the polycarbonate produced by the melt polycondensation of an aromatic dihydroxy compound with diphenyl carbonate reaches at least 0.3 dl/g. Since the terminal blocking of the polycarbonate proceeds rapidly after the addition, the intrinsic visocity variation of the polycarbonate during the addition is 0.1 dl/g or less based on the intrinsic viscosity at the addition of the compound, and the terminal hydroxy group concentration can be suppressed to a level as low as 0 to 30 mol % (the terminal hydroxy group concentration of 30 mol % corresponds to 80 eq/ton when the intrinsic viscosity of the polycarbonate is 0.35 dl/g).

The amount of the compound expressed by the above formula (V) is preferably 0.5 to 2 mol, more preferably 0.7 to 1.5 mol, especially preferably 0.8 to 1.2 mol based on 1 equivalent of the terminal hydroxy group of the polycarbonate.

The terminal hydroxy group concentration of the polymer is preferably measured and confirmed each time prior to the addition of the compound. When continuously performing the polycondensation reaction under one the same polycondensation condition, the hydroxy group concentration determined at a preceding time of polycondensation may be used as it is for convenience sake.

A catalyst is necessary for performing the above terminal blocking reaction, and a catalyst used in the polycondensation reaction can be favorbly used as the catalyst for blocking reaction.

It is especially preferably to perform the terminal blocking reaction when the polycondesation of the polycaronate is completed and the polymer is still in molten state. Accordingly, the timing of terminal blocking reaction should be after the completion of polycondensation reaction of before the addition of a sulfonic acid derivative. The terminal blocking reaction can be carried out in a preferable way at the above-mentioned timing.

Even after the addition of a sulfonic acid derivative following the polycondensation of the polycarbonate, the terminal blocking is similarly possible by the addition of a new catalyst for the terminal blocking reaction to the polycarbonate.

In the present invention, various conventional additives can be added to the system at one or more of the stages before the terminal blocking reaction, during the blocking reaction and after the blocking reaction. The agents which can be added to the polymer are, for example, a thioether-type stabilizer, a hindered amine-type stabilizer, an epoxy-type stabilizer, a salicylic acid-type ultraviolet absorber, a benzotriazole-type ultraviolet absorber, a mold-releasing agent, a colorant, an antistatic agent, a slip agent, and antifogging agent, a natural oil, a synthetic oil, an organic or inorgaic wax filler, etc.

Production of Polycarbonate

The production of a polymer by the polycondensation reaction of an aromatic dihydroxy compound with diphenyl carbonate (hereunder abbreviated as DPC) can be carried out under the condition similar to the condition of conventional process.

Concretely, the aromatic dihydroxy compound is made to react with DPC as the first stage reaction at 80 to 250° C., preferably 100 to 230° C., more preferably 120 to 190° C. for 0.5 to 5 hours, preferably 1 to 4 hours, more preferably 1.5 to 3 hours under reduced pressure. The reaction of the aromatic dihydroxy compound with DPC is continued at increased reaction temperature while increasing the vacuum degree of the reaction system and, finally, the polycondensation exchange reaction of the aromatic dihydroxy compound with DPC is performed under a reduced pressure of 5 Torr or below, preferably 1 Torr or below at 240 to 320° C. It is preferable in the above process to keep the polymer temperature constantly at 255° C. or below to suppress the thermal decomposition and mechanical decomposition of the polymer.

Molecular Terminal of Polycarbonate

In the present invention, the ration of terminal hydroxy of the polycarbonate to the total terminals before the addition of a terminal blocking agent is favorably controlled to 75 to 35 mol %, preferably 70 to 40 mol %, more preferably 60 to 40 mol % from the viewpoint of reaction rate. The final terminal hydroxy group ratio can be controlled to a low level by this process to improve the modifying effect of the polymer.

The molar number of the terminal hydroxy group in a specific quantity of a polymer can be determined e.g. by 1H-NMR. The ratio of the terminal hydroxy group of the polymer is also controllable by the charging ratio of the aromatic dihydroxy compound and DPC to be used as raw materials.

There is no particular restriction to the equipment to supply a sulfonic acid derivative, various additives and a terminal blocking agent and the reactor for the terminal blocking reaction.

The methods for the addition of a sulfonic acid derivative, various additives and a terminal blocking agent have no particular restriction and these components may be added in solid state or in a state dissolved in various solvents. The terminal blocking agent may be added at a time or in several divided portions once the intrinsic viscosity of the polymer is increased to 0.3 which is a level usable for the desired object. In other words, the terminal blocking agent should be added after the intrinsic visocity of the polymer has reached at least 0.3 dl/g.

In the present invention, the amount of free chlorine which is contained in the polycaronate (copolymer) before the terminal blocking treatment and not covalent-bonded to the polymer is preferably suppressed to a low level, preferably to 50 ppm or below, more preferably to 5 ppm or below.

A polycarbonate containing free chlorine exceeding the above limit is undesirable because the catalytic activity regarding the terminal blocking reaction is liable to decrease, leading to failure in achieving quick and sufficient blocking of the terminals.

Too much chlorine content is undesirable as it causes adverse influence on the color and stability of the produced polymer. The chlorine content contained in the prepolymer can be suppressed to a low level by suppressing the chlorine contents in the raw materials.

In the present invention, an iron content of the polycarbonate before terminal blocking treatment is also favorably suppressed to a low level, preferably to 1 ppm or below, more preferably 0.7 ppm or below.

A polycarbonate having an iron content exceeding the above limit is undesirable because the catalytic activity regarding the terminal modifying reaction is liable to decrease, leading to failure in achieving quick and sufficient blocking of the terminals. Too much iron content is undesirable as it causes adverse influence on the color and stability of the produced polymer.

The iron content of the prepolymer can be suppressed to a low level by suppressing the iron contens in the raw materials to low levels and preventing the contamination of iron over the whole production process.

The system is preferably maintained at a reduced pressure after the addition of the terminal blocking agent to remove phenols formed by the reaction. The pressure is concretely 50 Torr or below, more preferably 10 Torr or below. The reaction is carried out usually under a pressure within the range of 0.01 to 100 Torr.

The reaction is carried out usually at 250 to 360° C., preferably 250 to 340° C. and more preferably 250 to 300+ C. after the addition of the terminal blocking agent. The polymer does not melt at a temperature lower than the above range, and decomposition and discoloration of the polymer take place at a temperature higher than the upper limit of the range to give undesirable result. The reaction time is usually 1 to 30 minutes, preferably 1 to 20 minutes. The reaction time of 1 to 15 minutes is allowable if desired.

The residual phenols in the polymer after the terminal blocking treatment can be suppressed to a low level in the present invention.

The concentration of the residual phenols in the polymer after the terminal blocking reaction is preferably 300 ppm or below, more preferably 200 ppm or below. When the residual phenol content is higher than the above configuration, lowering of molecular weight and discoloration of the polymer are liable to occur.

The above-mentioned polycondensation reaction may be carried out continuously or batchwise. The reactor for the above reaction may be either tank-type, tubular type or column-type.

The polycarbonate obtained by the present invention may be incorporate, within the range not to spoil the object of the present invention, with a conventional heat stabilizer, ultraviolet absorber, mold-releasing agent, colorant, antistatic agent, lubricant, antifogging agent, natural oil, synthetic oil, wax, organic filler, inorganic filler, etc.

According to the investigation performed by the inventors of the present invention, it has been clarified that some compounds including specific compounds among the compounds expressed by the above formula (V) can advantageously block the terminals of two molecules of a polycarbonate with one molecule of the compound and, as a result, give an action to remarkably improve the polymerization degree of a polycarbonate, that is, a polymerization promoting action.

Accordingly, the present invention similarly provides a process to produce a polycarbonate having increased intrinsic viscosity as a second process for producing a polycarbonate by the melt polycondensation of an aromatic dihydroxy compound with diphenyl carbonate, which is characterized in that a compound expressed by the following formula (VI)

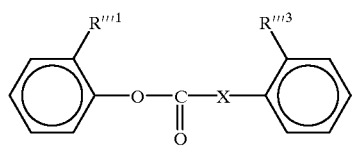
(VI)

[wherein $R'''^1$ is a chlorine atom, methoxycarbonyl or ethoxycarbonyl; X is an oxygen atom or a group of the following formula

—R'''-COO—

[wherein R''' is an alkylene group having a carbon number of from 1 to 30 or an arylene group having a carbon number of from 6 to 30]; and $R'''^3$ is a chlorine atom, methoxycarbonyl or ethoxycarbonyl] is added to the reaction system when the intrinsic viscosity of the polycarbonate reaches at least 0.3 dl/g to produce a polycarbonate having an intrinsic viscosity higher than that of the polycarbonate at the addition of the compound by more than 0.1.

The polymerization promoting agent expressed by the above formula (VI) is added to a polycarbonate having an intrinsic viscosity increased to at least 0.3 dl/g to give a polycarbonate having an intrinsic viscosity higher than that of the polycarbonate at the addition of the compound by more than 0.1 dl/g.

The addition amount of the polymerization promoting agent expressed by the above formula (VI) is preferably about 0.3 to about 0.7 mol, more preferably about 0.4 to about 0.6 mol and especially preferably about 0.45 to about 0.55 mol based on 1 equivalent of the terminal hydroxy group of the polycarbonate at the addition of the agent.

The polymerization promoting agent added to a polycarbonate reacts with the terminal OH(—OH) of the polycarbonate according to the following reaction formula

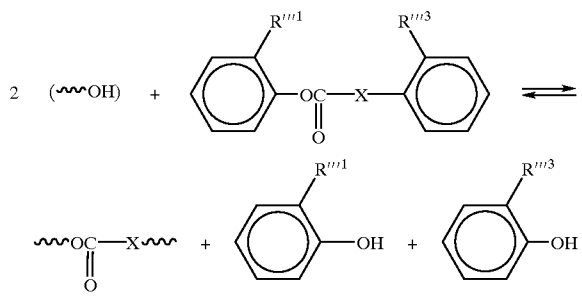

to effect coupling of two molecules of the polycarbonate.

The reaction is preferably carried out together with distilling out of the formed 2-substituted phenol to quickly perform the coupling reaction in high yield since the reaction forms two molecules of 2-substituted phenol according to the above reaction formula.

A polycarbonate having an intrinsic viscosity of preferably more than 0.4 and less than 0.1 dl/g and more preferably between 0.41 dl/g and 0.8 dl/g is produced at the end of the coupling reaction.

It should be understood that the descriptions on the above method to use the terminal blocking agent are applied as they are to the above-mentioned present invention to use a polymerization promoting agent regarding the matters not described here, such as polycondensation catalyst, neutralizing agent, polycondensation conditions, etc.

EXAMPLES

The present invention is described in more detail by the following Examples, which do not restrict the scope of the present invention.

The physical properties, etc. of the polymer in the following Examples were measured and evaluated by the following methods.

1) Intrinsic Viscosity [η]

The intrinsic viscosity was measured in methylene chloride using an Ubbellohde viscometer at 20° C.

2) Concentration of Terminal Hydroxy Group

The amounts of terminal hydroxy group and terminal phenyl group were measured by 1H-NMR (JOEL EX-270) at 20° C. on a specimen prepared by dissolving 0.02 g of a sample in 0.4 ml of deuteriochloroform and the terminal hydroxy group concentration was calculated by the following formula.

Terminal OH concentration (%)=(No. of terminal OH group/number of total terminals)×100

3) Stability of Polymer a) Short term stability

The short term stability was evaluated from the decreasing ratio (%) of [η] (Δ(η)/(η)×100) and the degradation of color of a polymer after heating the polymer in air at 340° C. for 15 minutes.

b) Long term stability the long term stability was evaluated from the decreasing ratio (%) of [η] (Δ(η)/(η)×100), the degradation of color and the haze value of a polymer after thermal aging the polymer at 150° C. for 500 hours.

4) Heat Stability on Wetting of Polymer

The decreasing ratio (%) of [η] (Δ(η)/(η)×100) was measured by holding a polymer in saturated steam atmosphere at 120° C. for 100 hours.

5) Storage Stability of Polymer Chips

A polymer was stored for 3 months in air at 30° C. and the degradation of color was evaluated by ΔL and Δb values.

6) Measurement of Relative Intensity of Fluorescent Light

The relative intensity was measured as the ratio of the fluorescent light intensity of a polymer to the fluorescent light intensity of a standard substance at substance at 465 nm (excitation wavelength: 320 nm) measured under the following conditions.

| Measurement conditions | |
|---|---|
| Instrument | Hitachi F4500 |
| Lamp | Xe, 150W |
| Slit width | Ex/Em 2.5 mm each |
| Photomultiplier | 400W |
| Sample (concentration) | 1 mg-polymer/5 ml-methylene chloride |

Standard Substance for Comparison

Phenyl salicylate 1.0×10$^{-3}$ mg/ml-methylene chloride

7) Stability of Melt Viscosity

The melt viscosity was measured under nitrogen gas flow at a shearing rate of 1 rad/sec and 270° C. for 30 minutes using type-RAA flow analyzer of Rheometrics Co. to calculate the changing rate of the viscosity per one minute. Since melt viscosity usually changes linearly after about 5 minutes after the melting at 270° C., the change of melt viscosity (unit: poise) with time was recorded and the changing rate of melt viscosity (stability of melt viscosity) was calculated by the formula (V1−V2)×100(V1×30) (%), wherein V1 is the melt viscosity at the starting point of the linear change of the viscosity and V2 is the melt viscosity 30 minutes after the starting point. The value should be not more than 0.5% for a polycarbonate resin having good long-term stability.

Example

Production of Polymer for Examples 1 to 8 (A-1 to 8)

A reactor provided with a starting apparatus, a distillation column and an evacuation apparatus was charged with 228 parts by weight of BPA, a prescribed amount of DPC, prescribed amounts of prescribed kinds of transesterification catalyst and tetramethylammonium hyroxide (9.1×10$^{-3}$ parts by weight; 100 μ chemical equivalent/1 mol BPA), the atmosphere was substituted with nitrogen and the content was dissolved at 140° C. The content was stirred for 30 minutes, heated to 180° C. and made to react for 30 minutes under the inner pressure of 100 mmHg, and the produced phenol was distilled out. Then the temperature in the reactor was raised to 200° C. while the pressure was gradually decreased, and the reaction was continued for 30 minutes under a pressure of 50 mmHg, distilling out the produced phenol. The system was further gradually heated and evacuated to 220° C. and 30 mmHg, and the reaction was carried out for 30 minutes under the above temperature and pressure condition. Further, the reaction was continued by repeating the heating and evacuation of the system according to the procedures described above to 240° C. and 10 mmHg, and then to 250° C. and 1 mmHg.

Finally, the polycondensation of polycarbonate was continued at 250 to 225° C. (care being taken constantly to keep the temperature at 255° C. or below) while keeping the value of the shear rate at stirring (unit: 1/sec) of the stirring blade of the polymerization vessel divided by the square of the radius (unit: cm) of the stirring blade at 0.001 (1/sec×cm$^2$), sampling of a part of the polymer was conducted while the polymerization was performed to determine the intrinsic viscosity and the terminal hydroxy group concentration, and the polycondensation was continued until the polymerization degree described in the Tables 1 and 2 was reached (the intrinsic viscosity described in the column of initial properties of the Tables 1 and 2).

The intrinsic viscosity at the end of polycodensation (the intrinsic viscosity described in the column of initial properties of the Tables 1 and 2) and the terminal hydroxy concentration are shown together with various conditions in the following Tables 1 to 2.

Comparative Examples

Production of Polymer for Comparative Examples 1 to 5 (B-1 to 5)

A reactor provided with a stirring apparatus, a distillation column and an evacuation apparatus was charged with 228 parts by weight of BPA, a prescribed amount of DPC, prescribed amounts of prescribed kinds of transesterification catalyst and tetramethylammonium hydroxide (9.1×10$^{-3}$ parts by weight; 100 μchemical equivalent/1 mol BPA), the atmosphere was substituted with nitrogen and the content was dissolved at 140° C. The content was stirred for 30 minutes, heated to 180° C. and made to react for 30 minutes under the inner pressure of 100 mmHg, and the produced phenol was distilled out. Then the temperature in the reactor was raised to 200° C. while the pressure was gradually decreased, and the reaction was continued for 30 minutes under a pressure of 50 mmHg, distilling out the produced phenol. The system was further gradually heated and evacuted to 220° C. and 30 mmHg, and the reaction was carried out for 30 minutes under the above temperature and pressure condition. Further, the reaction was continued by repeating the heating and evacuation of the system according to the procedures described above to 240° C. and 10 mmHg, and then to 280° C. and 1 mmHg.

Finally, the polycondensation of polycarbonate was continued at 280 to 285° C. while keeping the value of the shear rate at stirring (unit: 1/sec) of the stirring blade of the polmerization vessel divided by the square of the radius (unit: cm) of the stirring blade at 0.3 (1/sec×cm$^2$), sampling of a part of the polymer was conducted while the polymerization was performed to determine the intrinsic viscosity and the terminal hydroxy group concentration, and the polycondensation was continued until the intrinsic viscosity reached 0.4. The intrinsic viscosity at the end of polycondensation (the intrinsic viscosity described in the column of initial properties of the Tables 1 and 2) and the terminal hydroxy concentration are shown together with various conditions in the following Tables 1 and 2.

Examples and Comparative Examples

Terminal Blocking Reaction, Catalyst Deactivation: A1 to A8 and B1 to B5

A prescribed amount of SAMDPC (2-methoxycarbonylphenyl phenyl carbonate) was added to the polycarbonate (polymers A1 to A8 and B1 to B5) at 250° C. in a vacuum of 50 mmHg. Further, the reaction was continued for 10 minutes at 250° C. under a pressure of 1 mmHg or below.

Thereafter, the system was incorporated with a prescribed amount of a deactivation agent (catalyst deactivation agent) and mixed and stirred under the same temperature and pressure condition for 10 minutes to deactivate the catalyst.

Addition of Stabilizer: A1 to A8 and B1 to B5

The above polymers were incorporated with prescribed amounts of a stabilizer and a mold-releasing agent, extruded with a twin-screw extruder and pelletized.

Various physical properties of the produced polymers A1 to A8 and B1 to B5 are shown in the following Tables 1 and 2 together with various conditions.

TABLE 1

|  | Ex. 1 | Ex. 2 | Ex. 3 | Ex. 4 | Comp. Ex. 1 | Comp. Ex. 2 | Comp. Ex. 3 |
|---|---|---|---|---|---|---|---|
| 1) Polymer | A-1 | A-2 | A-3 | A-4 | B-1 | B-2 | B-3 |
| 2) Raw materials |  |  |  |  |  |  |  |
| Amount of DPC | 220 | 220 | 220 | 220 | 220 | 220 | 220 |
| (DPC/BPA) molar ratio | 103 | 103 | 103 | 103 | 103 | 103 | 103 |
| Na catalyst (kind, amount $\mu$-chem. equiv/1 mol-BPA) | BPANa2 02 | NaOH 02 | LiOH 02 | Na Acetate 02 | BPANa2 20 | KOH 10 | Na Acetate 20 |
| 3) Initial properties of polymer |  |  |  |  |  |  |  |
| Polymerization degree; intrinsic viscosity($\eta$) | 0.4 | 0.4 | 0.4 | 0.4 | 0.4 | 0.4 | 0.4 |
| Terminal hydroxy group concentration (eq/ton) | 110 | 112 | 111 | 110 | 111 | 110 | 110 |
| 4) Additives (pts. wt. $10^3$/100 pts. wt. of polymer) |  |  |  |  |  |  |  |
| Stabilizer (kind, amount) | A205 | A205 | A205 | A205 | A205 | A205 | A205 |
| Stabilizer (kind, amount) | B125 | B125 | B125 | B125 | B125 | B125 | B125 |
| Mold releasing agent (kind, amount) | None | None | None | None | None | None | None |
| Deactivation agent (kind, amount) | DBSP, 0.2 | DBSP, 0.2 | DBSP, 0/34 | DBSP, 0.2 | DBSP, 3.4 | DBSP, 3.4 | DBSP, 3.4 |
| Terminal blocking agent (kind, amount) | SAMDPC 3.02 | SAMDPC 3.02 | SAMDPC 3.02 | SAMDPC 3.02 | SAMDPC 3.02 | SAMDPC 3.02 | SAMDPC 3.02 |
| 4) After addition of terminal blocking deactivation, stabilizing and mold releasing agents |  |  |  |  |  |  |  |
| Polymerization degree: intrinsic viscosity ($\eta$) | 0.4 | 0.4 | 0.4 | 0.4 | 0.4 | 0.4 | 0.4 |
| Stability of melt viscosity (%) | 0 | 0 | 0 | 0 | 0.2 | 0.1 | 0.2 |
| Relative intensity of fluorescent light ($10^3$) | 1 | 1 | 2 | 1 | 5 | 6 | 5 |
| Terminal OH concentration (eq/ton) | 10 | 11 | 11 | 11 | 10 | 10 | 10 |
| Color; L/a/b | 66/25/25 | 66/25/25 | 64/25/30 | 66/25/25 | 63/25/30 | 63/25/32 | 63/25/30 |
| 5) Storage stability of polymer chip: Degradation of color $\Delta$L, $\Delta$b | 0.201 | 0.101 | 0.202 | 0.101 | 2.5/2.7 | 2.5/3/0 | 2.5/2.7 |
| 6) Short term stability of polymer |  |  |  |  |  |  |  |
| Degradation of color $\Delta$L, $\Delta$b | 0.201 | 0.202 | 0.202 | 0.101 | 0.203 | 0.204 | 0.203 |
| Lower ratio of polymerization degree (%), $\Delta(\eta)/(\eta) \times 100$ | 2 | 2 | 2 | 2 | 2 | 3 | 2 |
| 7) Long term stability of polymer |  |  |  |  |  |  |  |
| Degradation of color $\Delta$L, $\Delta$b | 0.1/0.2 | 0.1/0.2 | 0.3/0.2 | 0.1/0.1 | 0.2/0.2 | 0.2/0.3 | 0.2/0.2 |
| Lowering of polymerization | 2 | 2 | 2 | 2 | 2 | 3 | 2 |
| Degradation of haze; $\Delta$H | 0 | 0 | 0 | 0 | 2 | 2 | 2 |
| 8) Wet heat stability of polymer |  |  |  |  |  |  |  |
| Lowering ratio of polymerization degree (%), $\Delta(\eta)/(\eta) \times 100$ | 2 | 2 | 2 | 2 | 3 | 3 | 3 |

Notations: BPANa2; bisphenol A disodium salt, A1; 2,4-di-t-butylphenyl phosphite, A2; triphenyl phosphite, B1, Irganox 1010, C1; glycerol monostearate, DBSP; dodecylbenzenesulfonic acid tetrabutylphosphonium salt, SAMDPC; 2-methoxycarbonylphenyl phenyl carbonate

TABLE 2

|  | Ex. 5 | Ex. 6 | Comp. Ex. 4 | Ex. 7 | Ex. 8 | Comp. Ex. 5 |
|---|---|---|---|---|---|---|
| 1) Polymer | A-5 | A-6 | B-4 | A-7 | A-8 | B-5 |
| 2) Raw materials |  |  |  |  |  |  |
| Amount of DPC | 216 | 216 | 216 | 229 | 229 | 229 |
| (DPC/BPA) molar ratio | 1.01 | 1.01 | 1.01 | 1.07 | 1.07 | 1.07 |
| Na catalyst (kind, amount, $\mu$-chem. equiv/1 mol-BPA) | BPANa2 0.5 | BPANa2 0.5 | BPANa2 0.5 | BPANa2 2.0 | BPANa2 2.0 | BPANa2 2.0 |
| 3) Initial properties of polymer |  |  |  |  |  |  |
| Polymerization degree; intrinsic viscosity ($\eta$) | 0.4 | 0.4 | 0.4 | 0.4 | 0.4 | 0.4 |
| Terminal hydroxy group concentration (eq/ton) | 122 | 122 | 122 | 40 | 40 | 40 |
| 4) Additives (pts. wt. $10^3$/100 pts. wt. of polymer) |  |  |  |  |  |  |
| Stabilizer (kind, amount) | A1;05 | A1;05 | A1;05 | A1;05 | A1;05 | A1;05 |
| Stabilizer (kind, amount) | B1;25 | B1;25 | B1;25 | None | None | None |
| Mold releasing agent (kind, amount) | C1;20 | C1;20 | C1;20 | C1;20 | C1;20 | C1;20 |
| Deactivation agent (kind, amount) | DBSP; 0.2 | DBSP; 0.2 | DBSP; 0.2 | DBSP; 0.46 | DBSP; 0.37 | DBSP; 0.23 |
| Terminal blocking agent (kind, amount) | SAMDPC 8.08 | SAMDPC 1.18 | SAMDPC 0.36 | None | None | None |
| 4) After addition of terminal blocking deactivation, stabilizing and mold releasing agents |  |  |  |  |  |  |
| Polymerization degree: intrinsic viscosity ($\eta$) | 0.4 | 0.4 | 0.4 | 0.4 | 0.4 | 0.4 |
| Stability of melt viscosity (%) | 0 | 0 | 0 | 0.1 | 0.2 | 0.7 |
| Relative intensity of fluorescent light ($10^3$) | 1 | 1 | 1 | 1 | 1 | 1 |
| Terminal OH concentration (eq/ton) | 20 | 83 | 110 | 40 | 40 | 40 |
| Color; L/a/b | 65/25/25 | 65/25/27 | 65/26/37 | 66/25/25 | 66/25/25 | 66/25/25 |
| 5) Storage stability of polymer chip: Degradation of color $\Delta L$, $\Delta b$ | 0.1/0.2 | 0.2/0.6 | 0.3/1.1 | 0.2/0.2 | 0.2/0.3 |  |
| 6) Short term stability of polymer |  |  |  |  |  |  |
| Degradation of color $\Delta L$, $\Delta b$ | 0.2/0.2 | 0.2/0.4 | 0.3/1.5 | 0.1/0.2 | 0.1/0.2 | 0.2/0.5 |
| Lowering ratio of polymerization degree (%); $\Delta(\eta)/(\eta) \times 100$ | 2 | 3 | 4 | 2 | 3 | 6 |
| 7) Long term stability of polymer |  |  |  |  |  |  |
| Degradation of color $\Delta L$, $\Delta b$ | 0.2/0.1 | 0.3/0.4 | 0.3/1.3 | 0.2/0.2 | 0.2/0.2 | 0.3/1.1 |
| Lowering ratio of polymerization degree (%); $\Delta(\eta)/(\eta) \times 100$ | 2 | 3 | 3 | 2 | 3 | 5 |
| Degradation of haze; $\Delta H$ | 0 | 1 | 2 | 2 | 3 | 4 |
| 8) Wet heat stability of polymer |  |  |  |  |  |  |
| Lowering ratio of polymerization degree (%); $\Delta(\eta)/(\eta) \times 100$ | 2 | 3 | 6 | 2 | 4 | 10 |

Notations: BPANa2; bisphenol A disodium salt, A1; 2,4-di-t-butylphenyl phosphite, A2; triphenyl phosphite, B1, Irganox 1010, C1; glycerol monostearate, DBSP; dodecylbenzenesulfonic acid tetrabutylphosphonium salt, SAMDPC; 2-methoxycarbonylphenyl phenyl carbonate.

What is claimed is:

1. An aromatic polycarbonate having good color stability, characterized in that said polycarbonate has a main repeating unit expressed by the following general formula (3)

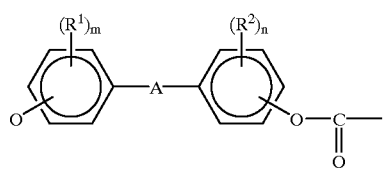

(3)

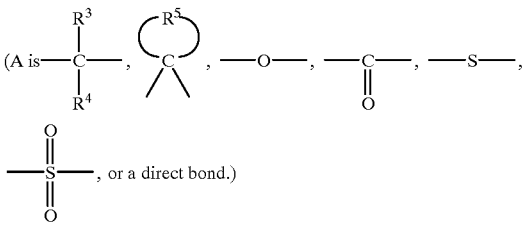

(wherein $R^1$ and $R^2$ are each, same or different, a hydrogen atom, a halogen atom or a hydrocarbon group having a carbon number of from 1 to 12; the terms m and n are each, same or different, a number selected from zero and integers of from 1 to 4; in the group A, $R^3$ and $R^4$ are each, same or different, a haolgen atom or a monovalent hydrocarbon group having a carbon number of from 1 to 12; $R^5$ is an alkylene group having a carbon number of from 3 to 8), the stability of melt viscosity of the polycarbonate is 0.5% or below, the terminal hydroxy group concentration of the polycarbonate is 100 eq/ton or below and the fluorescense spectrum of the polycarbonate (the excitation wavelength of 320 nm (has a relative intensity of fluorescent light of $4.0 \times 10^{-3}$ or below at 465 nm based on a standard substance.

2. An aromatic polycarbonate according to the claim 1, wherein said polycarbonate is produced by reacting an aromatic dihydroxy compound with a carbonic acid diester in the presence of a transesterification catalyst.

3. An aromatic polycarbonate according to the claims 1 or 2, wherein said polycarbonate is formed by transesterification reaction and the amount of the transesterification catalyst for the transesterification reaction per 1 mol of the aromatic dihydroxy compound is $1.0 \times 10^{-5}$ to $5.0 \times 10^{-4}$ chemical equivalent of basic nitrogen atom and/or basic phosphorus atom for a basic nitrogen compound and/or a basic phosphorus compound, and $5.0 \times 10^{-8}$ to $5.0 \times 10^{-6}$ chemical equivalent of an alkali metal for an alkali metal compound.

4. An aromatic polycarbonate according to either one of the claims 1 to 3, wherein said aromatic polycarbonate is deactivated by a catalyst deactivation agent.

5. An aromatic polycarbonate according to the claim 4, wherein the catalyst deactivation agent is at least one kind of sulfonic acid derivative selected from the group consisting of compounds expressed by the following formulas (I) to (IV)

$$A^1\text{-}(Y^1\text{-}SO_3X^1)_m \quad \text{(I),}$$

$${}^+X^2\text{-}A^2\text{-}Y^1\text{-}SO_3{}^- \quad \text{(II),}$$

$$A^3\text{-}({}^+X^3)_n\text{-}(R\text{—}Y^1\text{-}SO_3{}^-)_n \quad \text{(III), and}$$

$$A^5\text{-}Ad^1\text{-}A^4\text{-}(Ad^2\text{-}A^5)_k \quad \text{(IV).}$$

6. A stabilized aromatic polycarbonate according to either one of the claims 1 to 5, wherein the molecular terminal of said aromatic polycarbonates is composed mainly of —O—Ar (an aryloxy; Ar representing an aryl group) and —AR'-OH (hydroxy, Ar' representing an aryl group) and the ratio of said hydroxy group to the total molecular terminals is between 0 and 25 mol %.

7. An aromatic polycarbonate according to either one of the claims 1 to 6, wherein the aromatic polycarbonate has its terminal hydroxy group decreased with at least one kind of compound selected by the following formula (V):

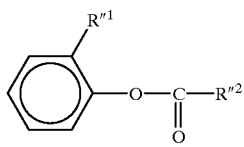

(V)

* * * * *